US008606675B1

(12) United States Patent  
Barrett

(10) Patent No.: US 8,606,675 B1  
(45) Date of Patent: *Dec. 10, 2013

(54) METHOD OF NETWORKING MARKETING

(71) Applicant: West Corporation, Omaha, NE (US)

(72) Inventor: Donald Barrett, Beverly, MA (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/795,034

(22) Filed: Mar. 12, 2013

Related U.S. Application Data

(63) Continuation of application No. 11/643,549, filed on Dec. 21, 2006, now Pat. No. 8,423,438.

(60) Provisional application No. 60/848,003, filed on Sep. 28, 2006.

(51) Int. Cl.  
*G06Q 40/00* (2012.01)

(52) U.S. Cl.  
USPC .......................................................... 705/35

(58) Field of Classification Search  
USPC .......................................................... 705/35  
See application file for complete search history.

(56) References Cited

U.S. PATENT DOCUMENTS

| 5,930,764 | A | 7/1999 | Melchione et al. |
| 6,134,533 | A | 10/2000 | Shell |
| 6,957,220 | B2 | 10/2005 | Lamkin et al. |
| 6,980,962 | B1 | 12/2005 | Arganbright et al. |
| 7,668,725 | B2 | 2/2010 | Alston |
| 7,704,138 | B2 | 4/2010 | Tallal, Jr. |
| 2002/0072957 | A1 | 6/2002 | Thompson et al. |
| 2004/0103022 | A1 | 5/2004 | Chilcoat, III et al. |
| 2004/0230511 | A1 | 11/2004 | Kannan et al. |
| 2005/0010470 | A1 | 1/2005 | Marino |
| 2005/0125334 | A1 | 6/2005 | Masella et al. |
| 2005/0222967 | A1 | 10/2005 | Adir |
| 2005/0289003 | A1 | 12/2005 | Thompson et al. |
| 2006/0095319 | A1 | 5/2006 | Cardwell |
| 2006/0194185 | A1 | 8/2006 | Goldberg et al. |
| 2006/0235764 | A1 | 10/2006 | Bamborough et al. |

FOREIGN PATENT DOCUMENTS

| WO | PCT/US99/28605 | * | 2/1999 |
| WO | PCT/US99/28605 | | 8/2000 |

OTHER PUBLICATIONS

Grimes & Reese: Legal Principles of Multilevel Marketing, Mar. 9, 2005, Internet Archives, pp. 1-13.*  
Lysecky et al.: Dynamic FPGA Routng for Just-in-Time FPGA Compilation, DAC 2004, Jun. 7-11, 2004, San Diego, California, pp. 1-6.*  
Gottlieb et al.,: Automated Provisioning of BGP Customers, Nov./Dec. 2003, AT&T Labs Research, IEEE Network, pp. 44-55.*

* cited by examiner

*Primary Examiner* — Bijendra K Shrestha

(57) ABSTRACT

The present invention is directed to an improved method of network marketing that combines direct response advertisement with network marketing. The invention includes providing a registry that stores debit and credit entries for individual IBO accounts, wherein the registry is in communication with a computer network. The invention also includes providing a hot leads database in communication with the computer network, wherein the hot leads database provides leads generated through a direct marketing campaign. The method further includes allowing qualified IBO terminals in communication with the computer network to access the hot leads database and request lead packages. The method includes debiting IBO accounts in the registry in response to these requests for lead packages. Additionally, the method includes providing a sales database in communication with the computer network wherein the sales database is accessible to the qualified IBO terminals.

20 Claims, 7 Drawing Sheets

METHOD OF NETWORKING MARKETING

CROSS-REFERENCE TO RELATED APPLICATIONS

This application is a continuation from U.S. patent application Ser. No. 11/643,549, filed Dec. 21, 2006, and entitled "METHOD OF NETWORK MARKETING", which is a continuation from U.S. Provisional Patent Application Ser. No. 60/848,003, filed Sep. 28, 2006, each of which is incorporated herein by reference in their entirety.

BACKGROUND OF THE INVENTION

The present invention relates generally to the field of multilevel marketing and more particularly to a combination of direct marketing and network marketing that eliminates a need for lead generation and implements an innovative power matrix commission structure to grow and maintain successful network marketing businesses.

DISCUSSION OF BACKGROUND INFORMATION

Multi level marketing (MLM) businesses employ well-known techniques for promoting sales and compensating independent business owners (IBOs). A typical MLM requires an IBO to generate leads by cold calling potential customers, sending mailings, meeting face-to-face with potential customers, and other like methods. With leads in place, an IBO promotes sales of a service or good with the intent of making a sale and hopefully convincing a lead to sign on as another IBO or as a distributor within a discreet network. As a primary IBO builds a personalized network by recruiting new members and IBOs, the number of commissions increase based on the additional sales falling within that network under that primary IBO.

This business approach is difficult and often tedious. Most IBOs are uncomfortable with targeting family and friends, let alone acquaintances, to promote sales. Generating leads is a tough task and time consuming, leading to frustration and often painfully slow business growth. Typically, within a short time, and usually in just under 1 year, an IBO either loses stamina or lacks monetary resources to continue supporting inventory purchases and other business overhead. Retaining a network of IBOs also becomes an issue. When IBOs in a network drop out and elect to discontinue their business, other members of that network generally follow suit out of discouragement. Primary IBOs lose all of their hard work invested in generating those connections, and with the loss of network members goes lost sources of income.

Even when subsidiary IBOs remain in a network, payouts to a primary IBO are often insufficient to maintain a profitable business. Promised pay out percentages seemingly based on profits often result in payout percentages on only a portion of profits. Payouts are generally an arbitrarily assigned number. Additionally, most MLM schemes pay out more initially and less as a network grows. This structure lacks great incentive to propagate business networks and that contributes to business collapse.

For the foregoing reasons, a need exists for a network marketing structure that provides reliable leads and that encourages and rewards IBOs who grow their business networks.

SUMMARY OF THE INVENTION

The present invention is directed to an improved method of network marketing that combines direct response advertisement with network marketing. The invention includes providing a registry that stores debit and credit entries for individual IBO accounts, wherein the registry is in communication with a computer network. The invention also includes providing a hot leads database in communication with the computer network, wherein the hot leads database provides leads generated through a direct marketing campaign. The method further includes allowing qualified IBO terminals in communication with the computer network to access the hot leads database and request lead packages. The method includes debiting IBO accounts in the registry in response to these requests for lead packages. Additionally, the method includes providing a sales database in communication with the computer network wherein the sales database is accessible to the qualified IBO terminals, wherein the sales database is configured to accept sales orders from qualified IBO terminals, and wherein the sales database is communicatively linked to the registry via the computer network. Lastly, the method includes crediting individual IBO accounts for sales orders according to terms of a payout agreement, wherein the sales database also is communicatively linked via the computer network to a centralized distribution system such that the entry of sales orders results in the shipment of the product ordered.

The present invention also includes a computer-implemented method for facilitating the sale of a product by an Independent Business Owner (IBO) network, wherein the method includes providing a registry that stores debit and credit entries for individual IBO accounts, and wherein the registry is in communication with a computer network. The method further includes allowing access to a centralized routing system for routing lead packages to qualified IBO terminals, wherein the centralized routing system is communicatively linked to the registry through the computer network, wherein the centralized routing system receives communications from hot lead customers in response to a direct marketing campaign and identifies qualified IBOs accounts in the registry having credit entries representing requests for hot lead customers, and wherein the centralized routing system pushes communications from hot lead customers directly to qualified IBO accounts associated with the plurality of qualified IBO terminals that are currently accessing the centralized routing system. The method also includes providing a sales database in communication with the computer network wherein the sales database is accessible to the qualified IBO terminals, wherein the sales database is configured to accept sales orders from qualified IBO terminals, and wherein the sales database is communicatively linked to the registry via the computer network. Lastly, the method includes crediting individual IBO accounts for sales orders according to terms of a payout agreement, wherein the payout agreement comprises an IBO payout tier governed by a geometric progression matrix which includes sales by a first IBO and sales by a plurality of additional IBOs sponsored by the first IBO, and wherein the sales database also is communicatively linked via the computer network to a centralized distribution system such that the entry of sales orders results in the shipment of the product ordered.

The present invention also includes an improved system for facilitating the sale of a product by an Independent Business Owner (IBO) network. The system includes a computer network communicatively connecting a plurality of IBO terminals to a registry for storing debit and credit entries for individual IBO accounts. The system further provides a centralized routing system also communicatively connected to the network, wherein the centralized routing system receives communications from hot lead customers in response to a direct marketing campaign, wherein the centralized routing system communicates with the registry and identifies qualified IBO accounts in the registry having credit entries representing requests for hot lead customers, and wherein the centralized routing system pushes communications from hot lead customers through the computer network directly to the qualified IBO accounts associated with the plurality of IBO terminals that are actively logged in to the centralized routing system. The improved system also comprises a dynamic sales database in communication with the computer network, wherein the sales database is accessible to the plurality of IBO terminals connected to the network, wherein the sales database is configured to accept sales orders from the plurality of IBO terminals, and wherein the sales database is communicatively linked to the registry such that the entry of sales orders results in a credit entry to one or more individual IBO accounts associated with the plurality of IBO terminals and such that the credit entry corresponds with a payout agreement that comprises an IBO payout tier governed by a geometric progression matrix that includes sales by a first IBO and sales by a plurality of additional IBOs sponsored by the first IBO.

These and other features, aspects, and advantages of the present invention will become better understood with reference to the following description, appended claims, and accompanying drawings where:

Figure 3:
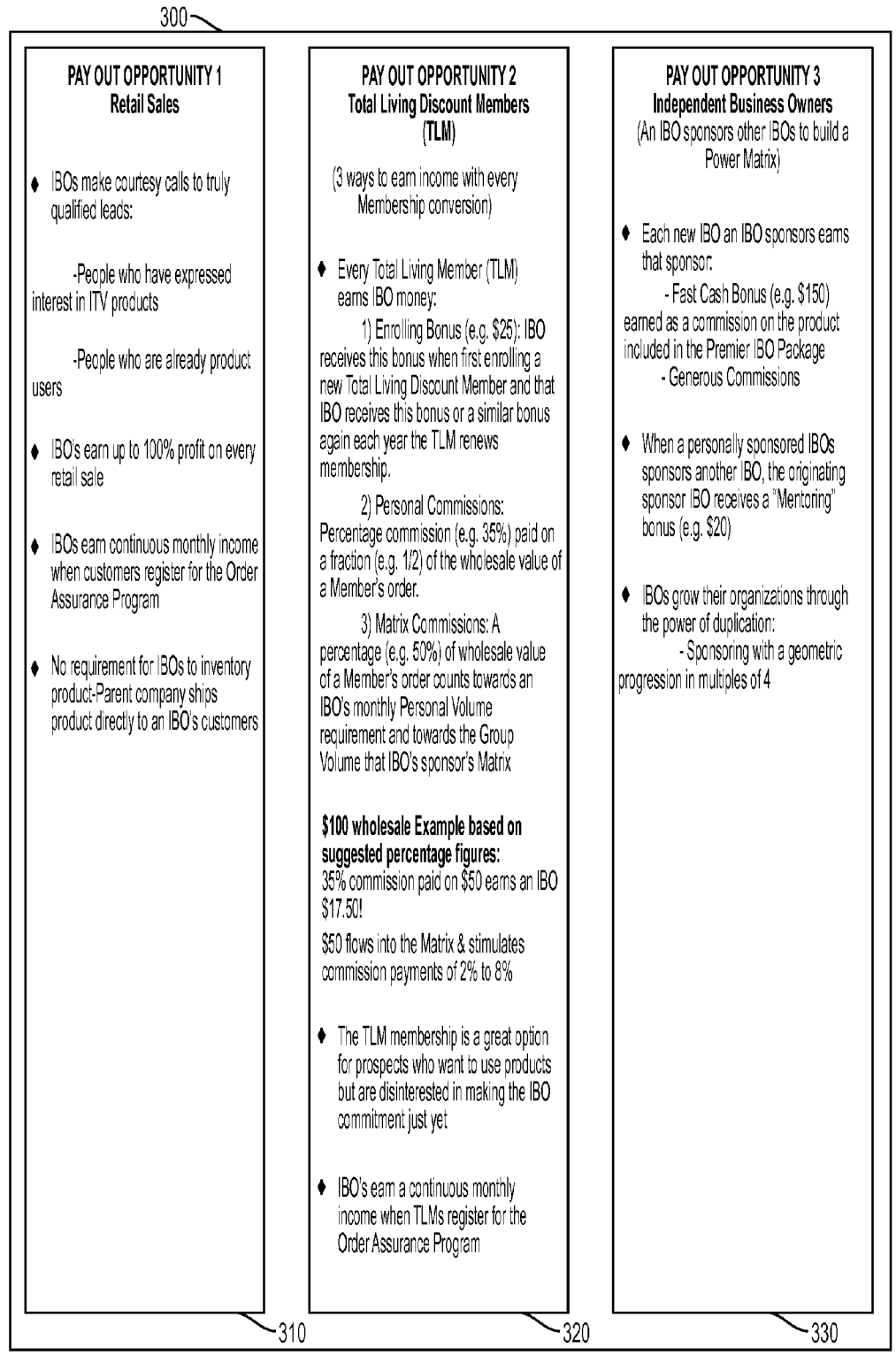

FIG. 3. is a schematic detailing several payout methods of an embodiment the present invention.

Figure 4:
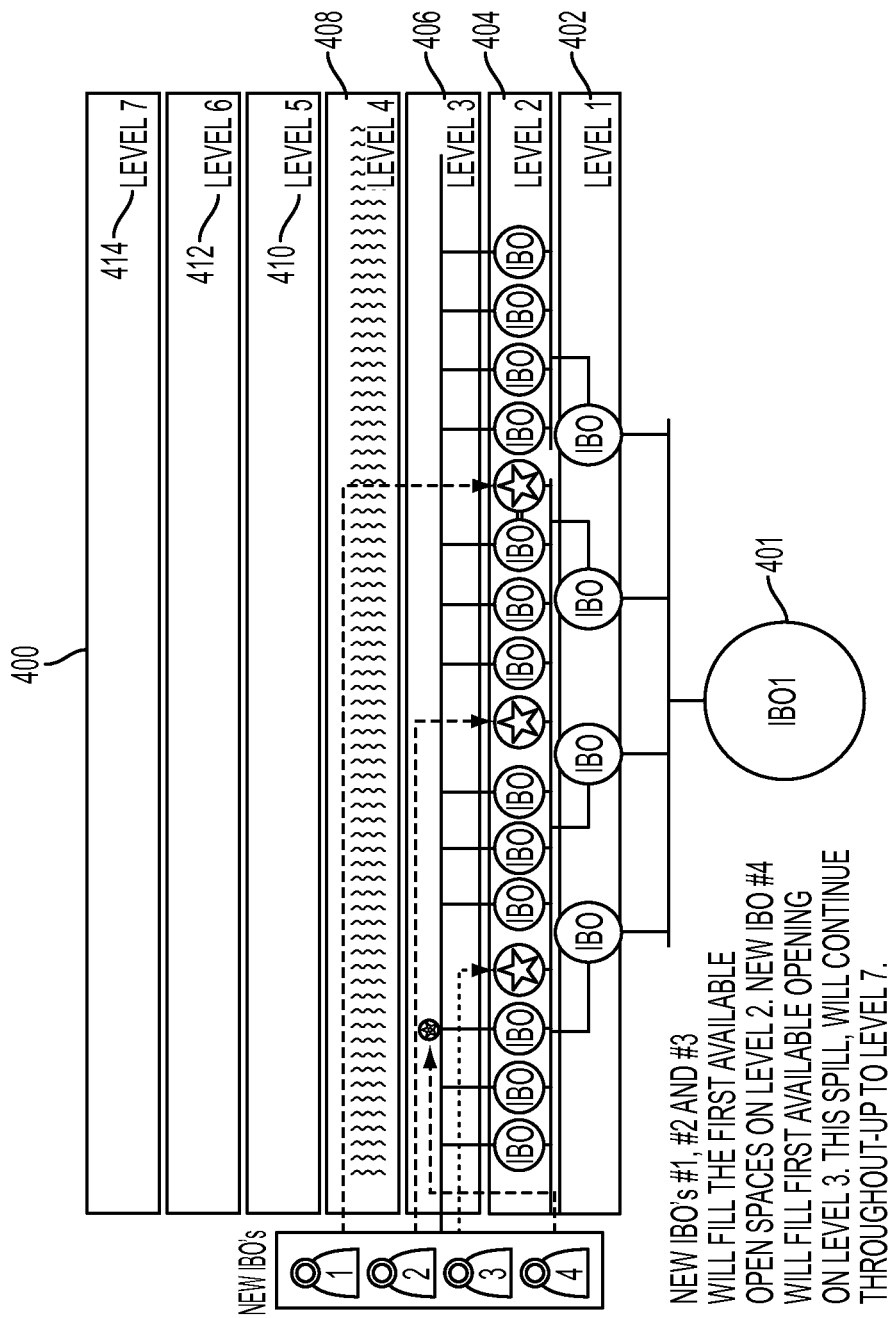

FIG. 4 is a diagram of an embodiment of a power matrix of the present invention.

Figure 5:
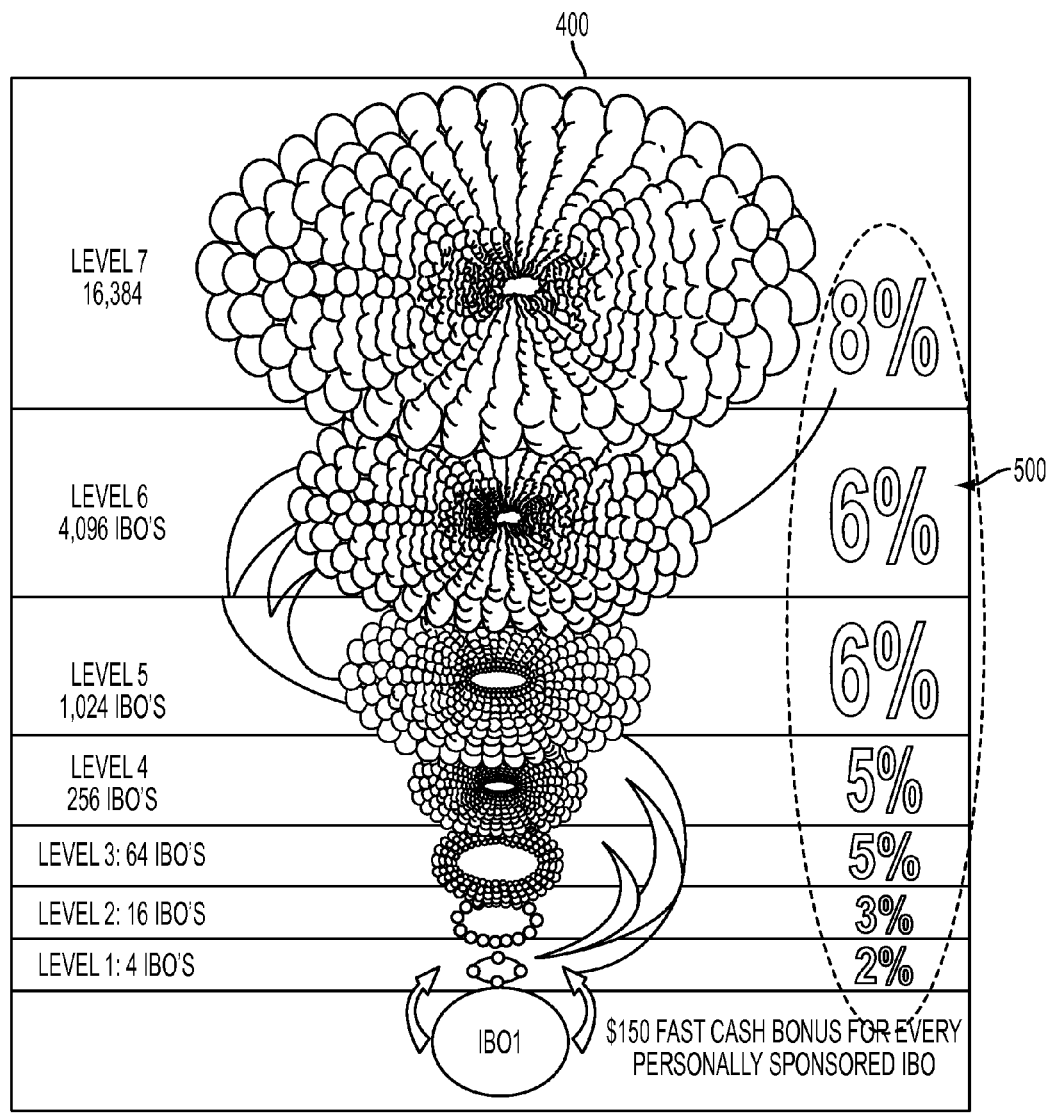

FIG. 5 is a diagram of commissions paid on levels of a power matrix according to an embodiment of the present invention.

DETAILED DESCRIPTION

The present invention resolves the stated deficiencies of typical multi level marketing systems, or network marketing systems, and provides effective tools for building a robust business.

Figure 1A:
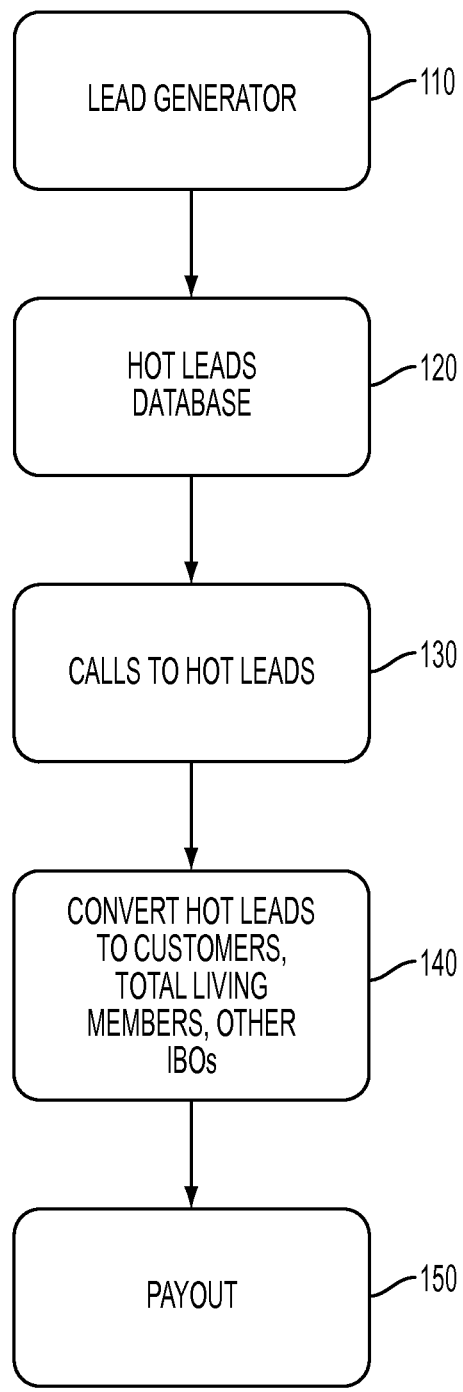
FIG. 1a is a schematic showing an overview of an embodiment of the present invention.

First, by combining direct marketing with network marketing this improved method of network marketing eliminates an IBO's struggle to uncover viable, lasting leads. Direct marketing campaigns may take several forms, such as infomercials, direct paper mailings, and direct electronic mailings. As FIG. 1a depicts, each campaign effectively becomes a lead generator 110. One infomercial, for example, can generate thousands of calls. Typically, 7 out of 10 callers request more information before making a purchase of a particular product. These callers are "hot leads" because they have responded to a lead generator 110 out of genuine interest. Generally, these hot leads are individuals who have expressed interest in particular products or who are already users of a particular brand of product.

Leads are readily available in a centralized repository and are searchable by specific product of interest, by region, state, city or zip code. Lead packages are available, preferably for purchase, to all active IBOs, and once purchased, leads are forever linked with a particular, active IBO. In a preferred embodiment, active IBOs pay a nominal fee for each lead, for example $2 or $3. The fee structure adds a level of commitment to pursue leads and keeps IBOs invested in growing their business. IBOs additionally may pursue their own leads outside of those provided by this improved method.

A hot leads database 120 contains a directory of these viable leads, which represent existing business relationships. Interested leads, or potential customers, are then available on a global scale to IBOs growing their businesses. IBOs who have purchased leads log in to the hot leads database 120 to search for and secure their leads. With contact information for purchased hot leads 130 on hand, the IBOs then make outbound calls to hot leads 130 and convert hot leads 130 into Customers, Total Living Members (TLMs) or other IBOs 140.

Figure 1B:
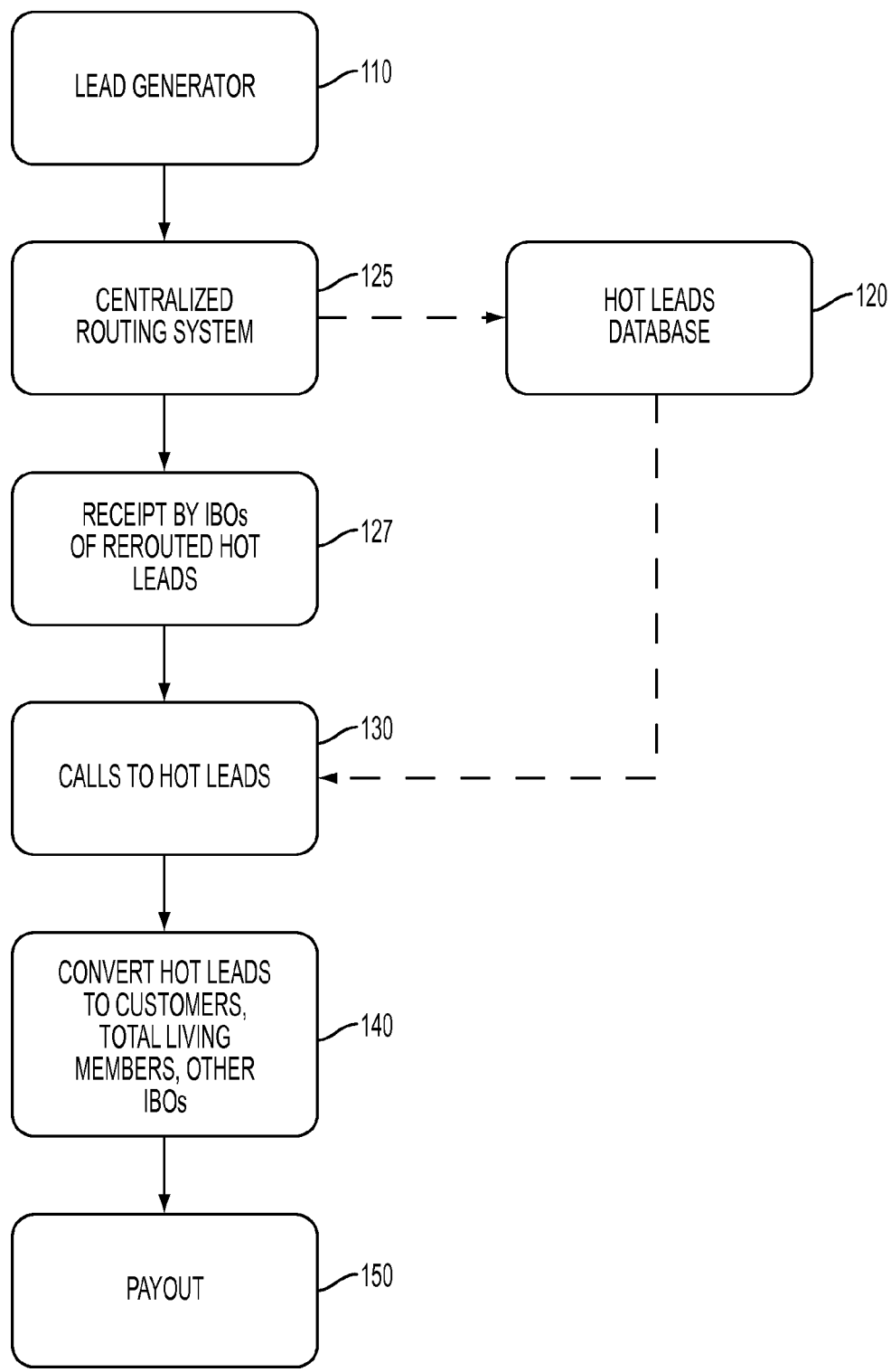
FIG. 1b is a schematic showing an overview of another embodiment of the present invention.

In an alternate embodiment depicted in FIG. 1b, the hot leads database 120 links to a routing system 125, or hub, that pushes leads 130 out to IBOs who have prepaid for this contact information and who are actively logged into the centralized routing system 125. These routing systems are well known systems in the direct marketing arena for redirecting calls, emails, faxes and live webchats. Examples of these routing systems include West Corporation's Hosted VACD and Spectrum® system, LiveOps' Hosted Contact Center system, and Interactive Intelligence's Customer Interaction Center™. Applying such systems to this network marketing method eliminates the step of first creating a hot leads database 130 and then requiring IBOs to search the database 130 for leads. The routing system 125 may create a hot leads database 120 additionally and simultaneously to pushing hot leads to IBOs in real time, but IBOs only need to pre-purchase a number of leads and then log in to the routing system 125 to automatically receive hot leads 130. This method has the added benefit of IBOs responding to potential customers in real time while their interest in a particular product is piqued, rather than IBOs responding after a potential delay created by first logging the hot leads' 120 contact information into a database 120 for storage and later retrieval by IBOs.

IBOs convert hot leads 130 into various categories, and in a preferred embodiment, converted leads 130 fall into three main categories: Customers, Total Living Members, and IBO leads. A payout 150 then occurs in accordance with the payout terms established at each of the three levels, which in a preferred embodiment respectively are called retail profits, member commissions, or matrix commissions. The following paragraph describes each type of lead in more detail.

Customers are individuals interested in buying products at a retail price. These customers may make single purchases or they may purchase an automated, repeat distribution option. Total Living Members purchase a preferred membership that costs less than IBO membership. TLMs are individuals who are disinterested in reselling product as an IBO, but are interested in purchasing product at wholesale cost. In other words, this preferred customer concept offers substantial discounts to TLMs. TLMs also may elect to purchase a repeat distribution option, and TLMs may upgrade to IBO status within 60 days of purchasing their membership by paying the difference in cost between TLM and IBO membership fees. The third category of leads, IBOs, are independent business owners who meet monthly requirements to maintain active status and who may recruit other IBOs to join their networks. An IBO requires sponsorship from another IBO in order to start a business and resell product.

An active IBO meets a pre-established set of criteria. In a preferred embodiment of the improved method of network marketing, maintaining active status requires the following of an IBO: IBOs must satisfy a minimum personal volume or sales to retail customers each month. Active status also requires that IBOs participate in a monthly training program, the Monthly Action Program (MAP), which occurs via the Internet, conference calls, attendance at events, etc. Finally, a nominal fee requirement exists for annual renewal, which occurs on an IBO's anniversary date and entitles the IBO to certain distributed materials, such as updated catalogues, training materials and an anniversary gift. Each of these three requirements is preferably under $100, and any IBO failing to remain active for a defined period, preferably three consecutive months, downgrades automatically to TLM status or is removed from the matrix.

Figure 2A:
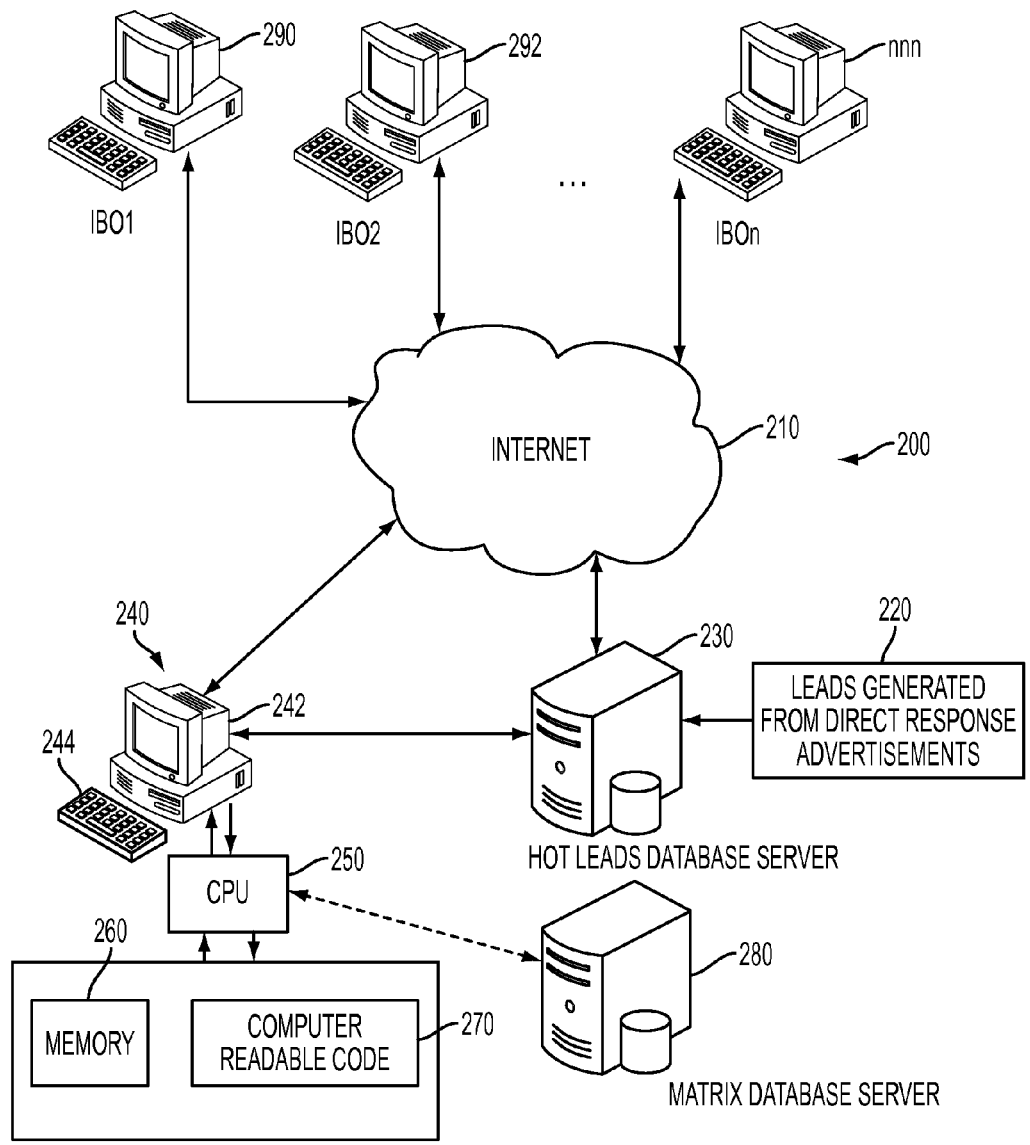
FIG. 2a is a diagram showing an embodiment of using a computer system in the method of the present invention.

A centralized repository monitors IBO status and other critical information preferably through electronic means. FIG. 2a shows an embodiment of a computer network 200 for use with the present invention. Because the present invention is available on a global level, and because the Internet 210 is a global electronic communications network linking private and public networks and computers, the Internet 210 is an appropriate medium for accomplishing the principals of this improved method of network marketing. Other less expeditious, more manual means are available nonetheless. Such means include, for example, manually telephoning requests for leads and requests to store sales information into a centralized repository or, for example, manually dispatching written or printed records of such requests and sales information. In those instances, the centralized repository may be manually manned by one or more operators who receive telephoned and printed information and then log that information manually to a tangible storage medium or electronic database. The operator or operators then similarly may respond manually or electronically to any such manually delivered requests.

Preferably though, the improved method operates using electronic means in accordance with a computer network 200 as shown in FIG. 2a. The leads generated from direct response advertisements 220 remain in an electronic data storage location, preferably a hot leads database server 230. This server 230 connects to the Internet 210 and also to a centralized repository computer 240 that comprises elements typical of a computing system. These elements include items such as a monitor 242, a keyboard 244, a processor such as a central processing unit (CPU) 250, and a memory storage area 260.

The memory storage area 260 may be random access memory (RAM), or a combination of RAM and some removable memory storage means such as floppy disk, EPROMs, PROMs, or USB storage devices. The memory storage area 260 contains computer readable code 270, or software, for performing tasks such as parsing information about an IBO and storing that information to the memory storage area 260. In an alternative embodiment, relevant data may store to a centralized matrix database server 280 for an added level of security and more expansive storage capacity. This storage element is alternatively referred to herein as a registry for storing individual IBO accounts and associated information. Processed and stored information may include IBO status, information regarding IBO power matrix levels, debit information for hot lead purchases and MAP purchases, and credit information for payouts. (The IBO power matrix will be described more fully below in reference to FIGS. 4 and 5.) Additionally, matrix database server 280 and hot leads database server 230 optionally may be the same server instead of two separate servers.

In a preferred embodiment, each IBO accesses the hot leads database server 230 though the Internet 210 via a terminal 290, 292, nnn, having components similar to those of the centralized repository computer 240. The IBO terminal also may be any number of electronic devices suitable for accessing the Internet over a wired or wireless network, such as for example a personal computing device (PCD), a wireless phone equipped for accessing the Internet, or a laptop computer. Preferably, the IBO terminal 290, 292, nnn, however, is a computer terminal or laptop computer.

A Bi-directional router (not shown) also may be disposed between each IBO terminal 290, 292, nnn and the Internet 210, between the Internet 210 and the hot leads database server 230, and also between the Internet 210 and the centralized repository computer 240. An unlimited number of IBO terminals 290, 292, nnn, therefore may access the hot leads data base server 230 via the Internet 210. IBOs, however, initially must receive sponsorship from other IBOs and must retain active status in order to qualify for accessing the hot leads database server 230 and to qualify for any payout or compensation. An IBO's request for leads from the hot leads database 230 triggers the centralized computer 240 to execute the stored computer readable code 270 and verify IBO eligibility before relaying information to an IBO terminal 190, 192, nnn and before storing any information regarding this transaction to the memory storage area 260 or matrix database server 280. The CPU 250 will execute computer readable code 270 to validate customer qualifications, such as prepaid credits for acquiring hot leads, and to calculate any necessary payments and payouts. The centralized repository computer 240 also receives sales order input information from IBOs terminals 290, 292, nnn communicating via the Internet 210 when hot leads convert to customers. The centralized repository computer 240 inputs sales order information into a sales database located within the memory storage area 260 or the matrix database server 280. In response to an input sales order, the centralized repository computer 240 then communicates with a distribution system (not shown) or, alternatively, functions as a distribution system. The distribution system then orchestrates product shipment, logging any information regarding the shipment into the sales database and communicating back to the corresponding IBO terminal 290, 292, nnn that product has shipped in fulfillment of the input sales order. Simultaneously, the centralized repository computer 240 logs a credit for the sales order information into a credit registry database (not shown) located in the memory storage area 260 or matrix database server 280, and the centralized repository computer 240 links that credit to the corresponding IBO account linked to a fulfilled sales order. The IBO then receives a payout based upon that credit, and that sale contributes to the group volume in the IBO's matrix and the matrices of any sponsoring IBOs.

Figure 2B:
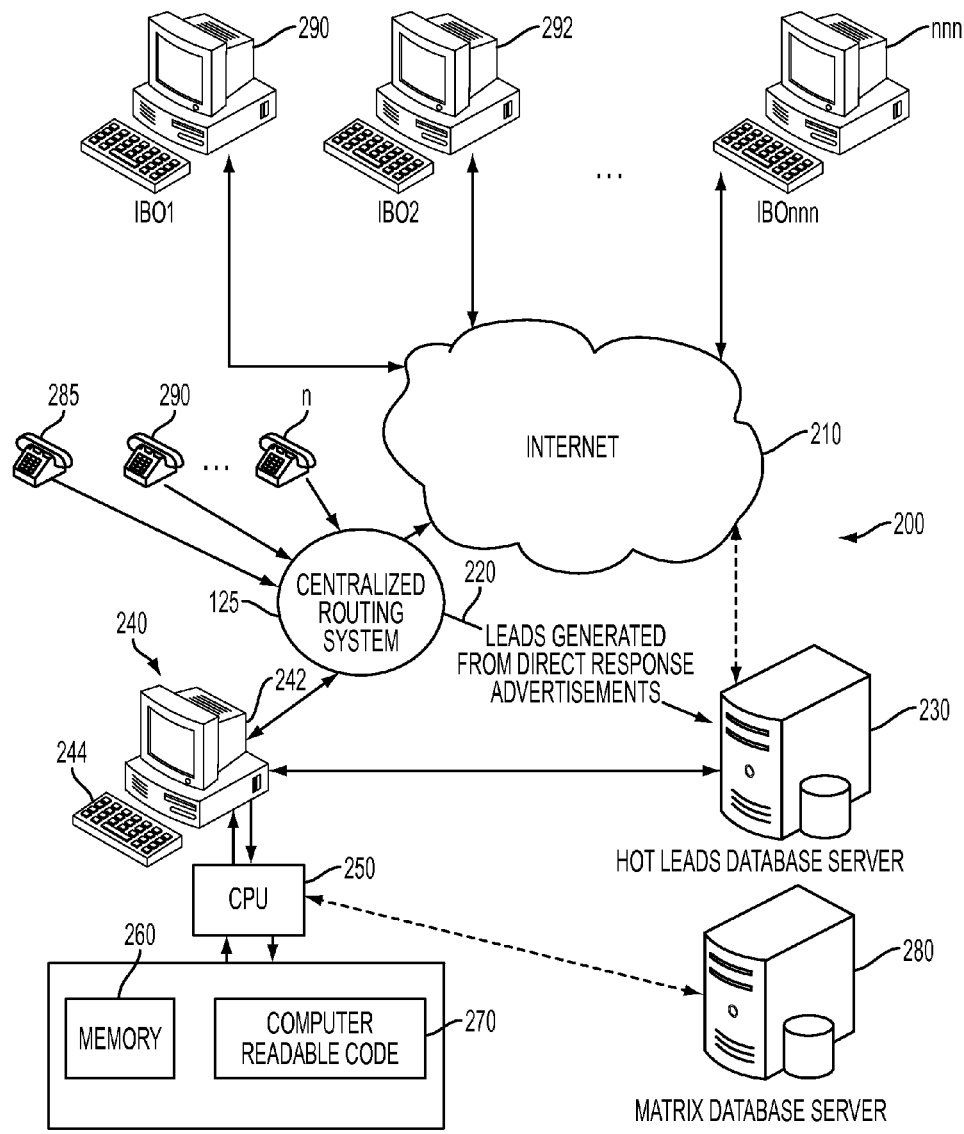
FIG. 2b is a diagram showing an alternative embodiment of using a computer system in the method of the present invention.

FIG. 2b depicts an alternative embodiment of this computer network 200 wherein the centralized routing system 125 communicates with the IBO terminals 290, 292, nnn preferably through the Internet 210. As described above, interested customers 285, 290, n contact the routing system 125 by some means, such as telephone, fax or computer, in response to direct marketing advertisements. The routing system then communicates with the centralized repository terminal 240 and the matrix database server 280 to identify qualifying IBOs requesting hot lead information. The routing system 125 then pushes interested customers 285, 290, n to the available, qualifying IBO terminals 290, 292, nnn that are in active communication with the routing system 125. Although IBO terminals 290, 292, nnn are depicted here as computer terminals, they also may be any other communication device, including a telephone and fax machine in communication with the centralized routing system 125. Additionally, the routing system 125 simultaneously and optionally communicates with the hot leads database either directly or through centralized repository terminal 240 to log information associated with the interested customers 285, 290, n into the hot leads database server 230. The hot leads database server 230 optionally is in communication with the Internet 210 so that the IBO terminals 290, 292, nnn still may access the hot leads database directly instead of logging into the routing system 125.

Turning now to the method by which this improved network marketing method pays out, FIG. 3 details some unique features. Most IBOs functioning within traditional multilevel marketing or network marketing companies relinquish their struggling businesses within 1 year of starting their businesses. The commission structure of the present improved network marketing invention is designed to encourage and motivate IBOs. As mentioned above, payout or compensation may occur in any number of ways, and in a preferred embodiment depicted in FIG. 3, the group of payout tiers 300 direct IBO payouts into three categories: Retail 310, TLM 320, and IBO 330. By paying out frequently and in a number of ways, this improved method of network marketing encourages IBOs to stay motivated and spurs business because each IBO has liquid assets readily available to reinvest in further growing a business.

The first category for payout in a preferred embodiment, retail customer sales 310, enables an IBO to earn up to 100% profit preferably on a weekly basis. IBOs who convert a hot lead into a retail customer receive a cash dollar profit preferably calculated as the retail value less the wholesale cost of product sold. Because a preferred embodiment of this improved network marketing method requires that IBOs only purchase inventory at an initial business stage and in a small quantity, no large inventory requirement consumes retail customer profits. Additionally, IBOs may receive continuous monthly income when Customers register to purchase repeat orders through the Order Assurance Program (OAP). A preferred embodiment of the present invention may incentivize customers to purchase the OAP option by offering some cost savings. In a preferred embodiment, a network marketing company implementing this invention handles order fulfillment and shipment to an IBO's customers and TLMs. This insures that retail purchases and OAP orders arrive consistently each month and prevents IBOs from having to purchase and store large quantities of inventory.

In a preferred embodiment of the present invention, a second category for payout, Total Living Membership (TLM) sales 320, may result in even greater profits than the first retail sales category. An IBO who enrolls a TLM immediately receives a fast cash bonus, for example, a $25 check, and a similar yearly bonus each time a TLM renews membership. Additionally, this IBO receives a commission paid on a portion of the wholesale value of a TLM's wholesale purchases. The remaining portion of the wholesale value counts toward an IBO's personal volume. Personal volume represents volume of products purchased personally by the IBO as well as by their retail customers and TLMs. In a preferred embodiment, meeting the predetermined personal volume requirement is a monthly requirement for retaining active IBO status and may be fulfilled by a Customer or TLM who purchases a monthly OAP.

The third category of payout, the IBO category 330, occurs in accordance with a power matrix 400. FIGS. 4 and 5 are schematic representations of a preferred embodiment of this power matrix 400, which is a 4.times.7 matrix paying out commissions of 2% on a first level 402, 3% on second level 404, 5% on a third level 406, 5% on a fourth level 408, 6% on a fifth level 410, 6% on a sixth level 412, and 8% on a seventh level 414. Other matrix sizes and commission percentages may be applied to this method without altering the scope or spirit of the present invention.

The power matrix 400 provides a structure for quickly growing a lasting business network that provides long term residual income based on commissions and bonuses. The computer readable code 270 calculates payouts and populates an IBO's power matrix 400 as the IBO enrolls active and commission qualified IBOs into a network. Commission qualified IBOs are qualified to receive power matrix commissions retroactively to the first of the month in which an IBO qualifies for active status by fulfilling a personal volume requirement and MAP requirement.

The power matrix 400 of the preferred embodiment shown in FIGS. 4 and 5 grows in a geometric progression of multiples of 4. Each time a primary IBO sponsors a new IBO, or each time new IBO enrolls another IBO, the primary IBO's power matrix 400 grows. As an IBO sponsors and fills a level, new IBOs are automatically placed in the next available spot in the power matrix 400. Seven levels fill automatically as the computer readable code 270 places each newly enrolled IBO in a next available spot. This placement is called spill and helps an IBO to fill a power matrix 400 quickly and effortlessly when sponsoring new IBOs. Spill also benefits newly enrolled IBOs in a power matrix as additional IBOs are placed within their Power Matrix.

Specifically referencing FIG. 3, a primary IBO 401 enrolls any number of IBOs with the power matrix 400, but only 4 enrolled IBOs reside on first level 402 of the power matrix 400. Each enrolled IBO on the first level 402 may then enroll 4 IBOs. If a primary IBO enrolls more than 4 IBOs initially, the balance will populate on the second level 404 under each of the first level 402 enrollees. The computer readable code calculates placement by filling vacancies from left to right under each of the enrolled IBOs on the first level 402 and by allotting one new enrollee to each first level IBO before moving to a second spot under each first level IBO and before moving to a new level. By enrolling additional IBOs beyond a first level 402, a primary IBO 401 ensures a continuous stream of income while motivating a second level enrollee to continue building a network.

If a vacancy appears in the matrix, the computer readable code 270 implements a roll up policy. The frontline IBO with the highest status (defined in detail below) will roll up into the vacant position. If status is equal, the IBO with the largest number of personally sponsored active IBOs will roll up into the vacant position. If this value is equal among IBOs, then the IBO with the largest group volume will roll up into the vacant spot. Group volume is the total cumulative personal volumes of all IBOs within a sponsor IBO's power matrix 400.

Once they have reached a certain goal, IBOs can elect to add a 5.sup.th IBO position on their matrix's first level. A fifth spot becomes available to an IBO on the first level 402 of their power matrix 400 when the computer readable code 270 calculates that the first level 402, second level 404 and third level 406 are completely enrolled with IBOs. At that point, a fifth first-level position optionally may open and allow new IBOs to spill into and under that new branch of the power matrix 400. Conceivably, the power matrix 400 may be tailored to expand to any number of additional optional spots on the first level 402 at certain prescribed milestones.

Referring to FIG. 4, commission payouts 400 rank according to levels of the power matrix 400. Notably unique to this network marketing invention is that payouts 400 are higher for IBOs at the top of a matrix. Here, commissions increase with growth, another major motivating factor for IBOs using this invention. In this preferred embodiment, commission payouts 400 range from 2% to 8% according to level qualifications and these payouts 400 occur monthly.

Also according to a preferred embodiment, qualifications for commission payouts exist: IBOs are paid on 2 levels immediately when initially sponsored. When an IBO then personally sponsors and maintains 1 IBO, payouts occur on the third level 406. When they personally sponsor and maintain 2 IBOs, they are paid on the fourth level 408. When an IBO personally sponsors and maintains 3 new IBOs, payouts occur on the fifth level 410. When an IBO personally sponsors and maintains 4 new IBOs, payouts occur according to the sixth level 412, and, finally, when an IBO sponsors and personally maintains 5 new IBOs, payouts occur according to a seventh level. In other words, in order to receive payment according to a seventh level commission percentage, an IBO must have sponsored and must maintain at least 5 new active and commission qualified IBOs in their power matrix 400. The number of personally sponsored IBOs may accrue over a series of months, but the numbers who are commission qualified applies to month of rank achievement. Rank achievement is retroactive to the first of the month. These qualifications for payout advancement and accrual of personally sponsored IBOs represent a preferred embodiment. Many other qualification schemes are conceivable based on the power matrix 400 structure.

In addition to monthly commission payouts 400, active and commission qualified IBOs may earn bonuses. In a preferred embodiment, a primary IBO receives a mentoring bonus, for example $20, each time that an IBO enrolled on the second level 402 sponsors an IBO on the third level 404. Additionally, a percentage of wholesale value of any TLM's order counts toward group volume sales in an IBO's matrix, in the IBO's sponsor's matrix, and up the line to any other linked IBO's matrix in that branch.

In a preferred embodiment, a new IBO looking to start a matrix first acquires a sponsor IBO. Each newly sponsored IBO earns the sponsor IBO a fast cash bonus on any product included in the optionally purchased introductory Premier IBO Kit. In this embodiment, a new IBO initially must purchase an introductory package, called the Basic IBO Kit. The Basic IBO Kit comprises essential tools for business initiation, excluding any product. This Basic IBO Kit earns a sponsor IBO no commission payout. The more comprehensive Premier IBO Kit, however, does earn a sponsor IBO a commission payout. The Premier IBO Kit includes business support documentation and an initial supply of retail product. Both of these kits also include tools to create a customized website linked to and monitored via the centralized computer 240 of FIG. 2. New IBOs also receive access to a professional Business Management Center for assistance in effectively building and running their new business.

In this preferred embodiment, an established IBO can achieve several status levels labeled as bronze, silver, gold, and platinum. Each of the silver, gold and platinum status levels comprises one star, two star and three star levels. A car allowance bonus payout begins at one star platinum status and increases through three start platinum status. The following is a description of this preferred embodiment of an IBO's progression through the various ranks of the payout plan. Other delineations are selectable without departing from the spirit and scope of this invention.

A bronze level IBO maintains 2 personally sponsored active and commission qualified IBOs. A silver level IBO maintains 4 personally sponsored active and commission qualified IBOs. One star, two star and three star silver group volumes are achieved respectively at gross monthly group volume sales figures of $1000, $1500 and $2000. A gold IBO maintains 8 personally sponsored active and commission qualified IBOs. One star, two star and three star gold group volumes are achieved respectively at gross monthly group volume sales figures of $2500, $5000 and $7500.

A platinum IBO maintains 10 personally sponsored active and commission qualified IBOs who have each sponsored one or more commission qualified IBOs. IBOs of this rank have achieved 2 consecutive months of $10,000 of coded organizational, or group, volume, which includes their own personal volume within their power matrix 400. An IBO that has achieved Platinum status or higher, is eligible to earn a Team Mentoring bonus of $25 to $65 and an Infinity bonus of 1% to 5%. These bonuses are paid to active and commission qualified IBOs on their coded organizational volume only.

Once an IBO achieves Platinum status the process of "coding the organization" begins. The coded organization starts with the first newly personally sponsored IBO that the new Platinum IBO sponsors. From this point on, all IBOs sponsored into the organization are "coded". The Team Building Mentor Bonus and Infinity Bonus pay out on the "coded" portion of the organization only and pay out on consecutive levels until a new Platinum IBO emerges within the power matrix 400.

Once a new Platinum IBO emerges within an existing Platinum IBO's organization, the new Platinum IBO's organization enters the coding stage. The Team Mentoring and Infinity Bonus portion of that new Platinum IBO's leg pays out to the new Platinum IBO on his coded organization only.

An infinity bonus applies to platinum IBOs and is a percentage of volume paid on "Infinity Line" coded organization(s). Once an IBO achieves platinum status, the next IBO that that platinum ranked IBO personally sponsors into the power matrix 400 becomes an "Infinity Line" coded organization and an Infinity Bonus, for example 1%, pays out down to the next equal ranking IBO. When an IBO achieves one star platinum status, the next IBO that the one star platinum ranked IBO sponsors into the power matrix 400 begins a new "Infinity Line" coded organization and an Infinity Bonus pay out on that line. This pay out continues down to the next equal ranking IBO. Similarly, when an IBO achieves two star platinum status, the next IBO sponsored into the two star platinum ranked IBO's power matrix 400 begins a new "Infinity Line" coded organization and an Infinity Bonus pays out on that line. This payout continues down to the next equal ranking IBO.

A one star platinum IBO maintains 20 personally sponsored active and commission qualified IBOs who have each sponsored one or more commission qualified IBOs. A one star platinum IBO also earns 2 consecutive months of $20,000 Organizational Volume, or group volume, which may include their own Personal Volume within their 4.times.7 power matrix 400. A one star platinum IBO receives a team building mentor bonuses, for example a $35.00 check, and an infinity percentage bonus on coded organizational volume paid to the next equal ranking IBO, for example 2%. An IBO of this rank also qualifies for monthly car bonus of $500 with ownership documentation.

A two star platinum IBO maintains 30 personally sponsored active and commission qualified IBOs who have each sponsored one or more commission qualified IBOs. A two star platinum IBO also earns 2 consecutive months of $30,000 organizational volume, or group volume, which may include the two star platinum IBO's own Personal Volume within a 4.times.7 power matrix 400. A two star platinum IBO receives a team building mentor bonuses, for example a $50.00 check, and an infinity percentage bonus on coded organizational volume paid to the next equal ranking IBO, for example 3%. An IBO of this rank also qualifies for monthly car bonus of $750 with ownership documentation.

A three star platinum IBO maintains 50 personally sponsored active and commission qualified IBOs who have each sponsored one or more commission qualified IBOs. A three star platinum IBO also earns 2 consecutive months of $50,000 organizational volume, or group volume, which may include the three star platinum IBO's own Personal Volume within a 4.times.7 power matrix 400. A three star platinum IBO receives a team building mentor bonuses, for example a $65.00 check, and an infinity percentage bonus on coded organizational volume paid to the next equal ranking IBO, for example 5%. An IBO of this rank also qualifies for monthly car bonus of $1000 with ownership documentation.

It is noted that the foregoing examples have been provided merely for the purpose of explanation and are in no way to be construed as limiting of the present invention. While the present invention has been described with reference to an exemplary embodiment, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method, comprising:
storing debit and credit entries for individual Independent Business Owner (IBO) accounts in a registry, wherein the registry is in communication with a computer network;
providing a database of hot lead packages generated through a direct marketing campaign, wherein the database is communicatively linked to the registry through the computer network;
at least one of allowing access to the database by qualified IBO terminals for requesting the hot lead packages, wherein the IBO terminals are also in communication with the computer network and providing a centralized routing system associated with the computer network wherein IBO terminals actively logged into the centralized routing system are identified and communications from lead customers are pushed to the identified IBO terminals; and
debiting individual IBO accounts in the database in response to a corresponding requests for the hot lead packages.

2. The method of claim 1, comprising providing a sales database in communication with the computer network wherein the sales database is accessible to the qualified IBO terminals, wherein the sales database is configured to accept sales orders from qualified IBO terminals, and wherein the sales database is communicatively linked to the registry via the computer network.

3. The method of claim 2, comprising crediting individual IBO accounts for sales orders according to terms of a payout agreement, wherein the sales database also is communicatively linked via the computer network to a centralized distribution system such that the entry of sales orders results in the shipment of the product ordered.

4. The method of claim 3 wherein the payout agreement includes at least one of:
a plurality of payout tiers including at least a retail payout tier and a discount membership payout tier; and
an IBO payout tier governed by a geometric progression matrix which includes sales by a first IBO and sales by a plurality of additional IBOs sponsored by the first IBO.

5. The method of claim 4, wherein the geometric progression matrix provides at least one of:
grows in multiples of four, such that each first IBO sponsors four additional IBOs and each additional IBO sponsors up to four additional IBOs; and
employs a growth spill factor to increase the number of additional IBOs that a first IBO may sponsor once that first IBO's matrix expands to a prescribed size.

6. The method of claim 1, wherein IBOs earn continuous monthly income when their customers register for an Order Assurance Program.

7. The method of claim 6, wherein registering for the Order Assurance Program allows customers to pre-purchase and take delivery of product on an established, recurring schedule.

8. The method of claim 1, wherein the credit entry represents a cash payout to the IBO.

9. The method of claim 8, wherein the cash payout includes one or more bonuses, including a bonus for sponsoring an additional IBO.

10. A system, comprising:
a computer network communicatively connecting a plurality of Independent Business Owner (IBO) terminals to a registry for storing debit and credit entries for individual IBO accounts;
a centralized routing system communicatively connected to the computer network, wherein the centralized routing system:
receives communications from hot lead customers in response to a direct marketing campaign,
communicates with the registry and identifies qualified IBO accounts in the registry having credit entries representing requests for the hot lead customers, and
pushes communications from the hot lead customers to the qualified IBO accounts associated with the plurality of IBO terminals; and
a dynamic sales database in communication with the computer network, wherein the dynamic sales database is:
accessible to the plurality of IBO terminals;
configured to accept sales orders from the plurality of IBO terminals, and
communicatively linked to the registry such that the entry of sales orders results in a credit entry to one or more individual IBO accounts associated with the plurality of IBO terminals.

11. The system of claim 10, wherein the plurality of IBO terminals are devices such as computers, personal computing devices, cell phones, or any other devices capable of accessing the computer network via wired or wireless means.

12. The system of claim 10, further comprising a server for storing the sales database.

13. The system of claim 10, further comprising a database of lead packages generated through the direct marketing campaign and including hot lead customer information,
wherein the database is accessible to the plurality of IBO terminals via the computer network, and
wherein the database is communicatively linked to the registry such that requests for hot lead packages by IBOs associated with qualified IBO accounts signals the database to push hot lead customer information to the corresponding plurality of IBO terminals and debit the individual IBO accounts according to a prescribed hot lead fee agreement.

14. The system of claim 10, wherein the credit entry corresponds with a payout agreement that comprises an IBO payout tier governed by a geometric progression matrix that includes sales by a first IBO and sales by a plurality of additional IBOs sponsored by the first IBO.

15. The system of claim 14, wherein each IBO in a geometric progression matrix may sponsor a plurality of additional IBOs on a sublevel, and wherein all additional IBOs contribute to a first IBO's group volume.

16. The system of claim 15, wherein each IBO receives qualifying bonuses and payouts when their geometric progression matrix expands to include a certain number of sublevels and their group volume sales figures reach prescribed reward milestones.

17. The system of claim 14, wherein the geometric progression matrix grows in multiples of a set number, such that each first IBO sponsors the set number of additional IBOs and each additional IBO sponsors up to that set number of additional IBOs.

18. The system of claim 17, wherein the geometric progression matrix employs a growth spill factor to increase the number of additional IBOs that a first IBO may sponsor once that first IBO's matrix expands to a prescribed size.

19. The system of claim 10, wherein IBOs earn continuous monthly income when their customers register for an Order Assurance Program.

20. The system of claim 19, wherein registering for the Order Assurance Program allows customers to pre-purchase and take delivery of product on an established, recurring schedule.

* * * * *